United States Patent
Ananthanarayanan et al.

(10) Patent No.: US 12,393,618 B2
(45) Date of Patent: Aug. 19, 2025

(54) GENERATING AND IMPLEMENTING CONTEXT PROFILES IN PROCESSING QUERIES USING FOUNDATION MODELS

(71) Applicant: Microsoft Technology Licensing, LLC, Redmond, WA (US)

(72) Inventors: Ganesh Ananthanarayanan, Sammamish, WA (US); Manikanta Kotaru, Kenmore, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 18/335,787

(22) Filed: Jun. 15, 2023

(65) Prior Publication Data
US 2024/0419698 A1    Dec. 19, 2024

(51) Int. Cl.
*G06F 16/3329*   (2025.01)
*G06F 16/332*   (2019.01)
*G06F 16/335*   (2019.01)

(52) U.S. Cl.
CPC ...... *G06F 16/3329* (2019.01); *G06F 16/3325* (2019.01); *G06F 16/335* (2019.01)

(58) Field of Classification Search
CPC ............. G06F 16/3329; G06F 16/3325; G06F 16/332; G06F 16/335
See application file for complete search history.

(56) References Cited

U.S. PATENT DOCUMENTS

| | | | |
|---|---|---|---|
| 12,010,076 B1* | 6/2024 | Andrew | H04L 51/02 |
| 2024/0362409 A1* | 10/2024 | Kuan | G06F 40/30 |
| 2024/0403568 A1* | 12/2024 | Øhrn | G06F 40/40 |
| 2024/0419705 A1* | 12/2024 | Kotaru | G06N 3/045 |

OTHER PUBLICATIONS

International Search Report and Written Opinion received for PCT Application No. PCT/US2024/033184, Sep. 18, 2024, 12 pages.
Moons, et al., "Decoding Transformers on Edge Devices", Axelera AI Blog, Retrieved from the Internet: https://www.axelera.ai/blog/decodingtransformers-on-edge-devices, Jun. 12, 2023, 06 Pages.
"Facebookresearch/faiss", Retrieved From: https://github.com/facebookresearch/faiss, Retrieved on: May 24, 2023, 3 Pages.

(Continued)

*Primary Examiner* — Huyen X Vo
(74) *Attorney, Agent, or Firm* — Ray Quinney & Nebeker P.C.; James S. Bullough

(57) ABSTRACT

A context analysis system receives a query from a user. The context analysis system generates one or multiple context profiles and generates a prompt for a foundation model for each of the context profiles. The context analysis system analyzes each of the context profiles and generates a relevancy score. The context analysis system selects one of the context profiles based on the relevancy score. In some examples, the context analysis system iteratively determines predicted latencies and relevancies of processing a query in conjunction with a generated context and, based on the predicted latencies and/or relevancies, processes the query using a foundation model, such as a large language model (LLM).

20 Claims, 10 Drawing Sheets

(56) References Cited

OTHER PUBLICATIONS

"Pretrained Models", Retrieved From: https://www.sbert.net/docs/pretrained_models.html, Retrieved on: May 24, 2023, 6 Pages.

Reimers, et al., "Sentence-BERT: Sentence Embeddings using Siamese BERT-Networks", In repository of arXiv:1908.10084v1, Aug. 27, 2019, 11 Pages.

* cited by examiner

GENERATING AND IMPLEMENTING CONTEXT PROFILES IN PROCESSING QUERIES USING FOUNDATION MODELS

BACKGROUND

Recent years have seen significant increase in popularity and applications of artificial intelligence (AI) and machine learning (ML). In addition, with services hosted by cloud computing systems becoming increasingly available to end-users and other organizations, accessibility to more complex and robust computing models, such as large language models (LLMs) has become increasingly common. These foundation models can be trained to perform a wide variety of tasks, such as chat bots, providing answers to general questions, generating code and other programming script, and, in some cases, providing specific information about specific topics.

While foundation models and other foundation models provide useful tools for a wide variety of applications, foundation models have a number of limitations and drawbacks. For example, foundation models are often limited in providing information or processing tasks that involve specialized knowledge about a particular domain. In these and other applications, context retrieval can be very important to ensure that foundation models provide accurate and complete information. In conventional foundation models, the process of generating context often involves utilization of significant computing resources, and can become a problem in computing environments that have limited processing capacity and/or strict latency requirements.

These and other problems exist in connection with generating context and utilizing foundation models in a variety of applications.

DETAILED DESCRIPTION

Figure 1:
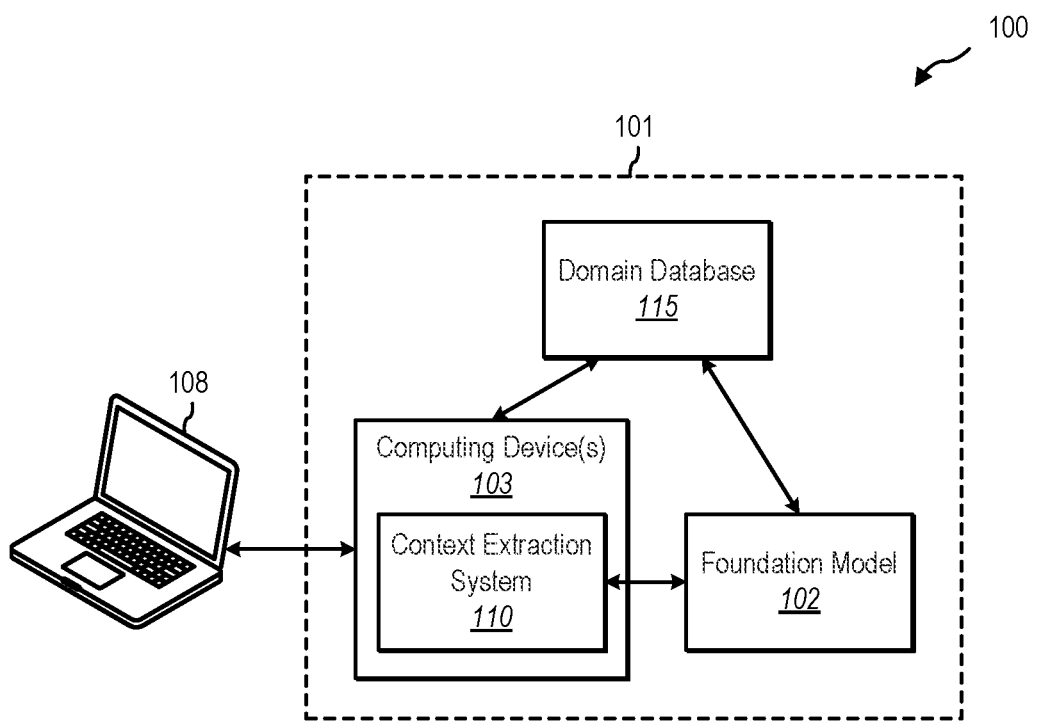
FIG. 1 illustrates an example environment including a context extraction system for retrieving context to process a query in accordance with one or more embodiments.

This application relates to systems, methods, and computer-readable media for generating context for a foundation model, such as a large language model (LLM) or other artificial intelligence (AI) or machine learning (ML) system(s). A foundation model may prepare multiple context profiles for a particular query. Each context profile may have a different complexity and associated cost (e.g., latency and/or processing budget). The foundation model may, within a particular latency budget, prepare an initial analysis of the query based on each of the context profiles. The responses based on the different context profiles may be analyzed for relevance, and a relevancy score may be generated for each response. If one of the context profiles has a response that is within a threshold relevance, the context profile may be selected and a final response to the query prepared. This may help to improve the relevance of the response while reducing the cost of the foundation model's response to the query.

In some embodiments, the foundation model is used in iteratively reviewing context profiles until a response is prepared that is within the relevancy threshold. For example, the foundation model may prepare a first context profile and prepare a first response based on the first context profile. If the first response is not within the relevancy threshold, then the foundation model may prepare a second context profile and prepare a second response based on the second context profile. If the second response is within the relevancy threshold, then the foundation model may prepare a final response based on the second context profile. If the second response is not within the relevancy threshold, then the foundation model may iteratively prepare further context profiles until one of the context profiles results in a response within the relevancy threshold. In some embodiments, subsequent context profiles have higher complexity with a higher associated cost. In some embodiments, subsequent context profiles are prepared based on a pre-determined pattern. In some embodiments, if the foundation model reaches a latency budget, then the foundation model selects the context profile associated with the response having the higher relevance.

In some embodiments, the foundation model simultaneously reviews context profiles and selects a best response from the simultaneously reviewed responses. For example, the foundation model may identify multiple context profiles and simultaneously prepare responses based on these context profiles. The foundation model may prepare relevancy scores from the responses and select the context profile having a higher (or highest) relevancy score. In some examples, the foundation model may prepare the context profiles to be analyzed within a latency budget.

In some embodiments, the foundation model maintains a set of different context profiles, their associated computation times, and likely relevance scores. For example, as the foundation model processes queries using different context profiles, the foundation model may record the particular context profile, the computation time, and the relevancy score. As the foundation model builds a database or collection of these context profiles, the foundation model may select a set of context profiles to analyze in response to a particular query. In this manner, the foundation model may generate responses using the context profiles that are most likely to fall within the relevancy threshold while reducing the cost (e.g., the latency and/or resource utilization) of the response. As used herein "cost of a response" refers to a metric of latency and/or utilization of resources. For example, a high cost may refer to a high quantity of latency and/or a high quantity of computing resources utilized by the system(s). Alternatively, a low cost may refer to a low metric of latency and/or low quantity of computing resources utilized by the system(s).

In some embodiments, a method includes receiving a query for a foundation model. The foundation model may receive a query and extract a first context profile for the query using language of the query and a context database (or domain database). The first context profile may include first context content based on the language of the query. Using the first context profile, a context generation system may generate a first prompt for the foundation model. The first prompt includes a first concatenation of the query and the first context content. The context generation system may input the first prompt into the foundation model, resulting in a first response from the foundation model. The context generation system may generate a first relevancy score or relevancy score for the first response based on a relevance of the first response to the query. The context generation system may extract a second context profile for the query using language of the query and the context database. The second context profile may include second context content based on the language of the query. Using the second context profile, a context generation system may generate a second prompt for the foundation model. The second prompt includes a second concatenation of the query and the first context content. The context generation system may input the second prompt into the foundation model, resulting in a second response from the foundation model. The context generation system may generate a second relevancy score or relevancy score for the second response based on a relevance of the second response to the query. The context generation system may select one of the first response or the second response based on the first relevancy score and the second relevancy score.

In some embodiments, a context generation system receives a query for a foundation model. The context generation system extracts, from a context database, a plurality of context profiles using the query. The context generation system generates a plurality of prompts for the foundation model. Each prompt of the plurality of prompts is generated using context from an associated context profile of the plurality of context profiles. The context generation system inputs the plurality of prompts into the foundation model to generate a plurality of responses to the query. The context generation system generates a plurality of relevancy scores. Each relevancy score of the plurality of relevancy scores is associated with a response of the plurality of responses. The relevancy scores are representative of a relevance of the responses to the query. The context generation system selects a best response of the plurality of responses based on a higher relevancy score of the plurality of relevancy scores.

The context generation system provides a number of advantages and benefits over conventional systems and methods. For example, by analyzing a plurality of responses based on a plurality of context profiles, the context generation system improves accuracy of the response to the query relative to conventional systems. Indeed, analyzing a plurality of responses and iteratively determining which of the responses is more relevant enables the context generation system to determine which context profile provides a more accurate answer. In some embodiments, analyzing a plurality of responses allows the context generation system to, over time, generate a database of context profiles that have been found to provide relevant and cost-effective request results.

In some examples, by analyzing a plurality of responses based on a plurality of context profiles, the context generation system may reduce the quantity of processing resources used in generating responses to input queries. For example, in one or more implementations, the context generation system iteratively evaluates relevancy of different context profiles to determine a context profile that can provide an accurate response that satisfies a relevancy score threshold. In addition, the context generation system may consider a latency budget associated with generating and utilizing the context profile to generate and/or identify a particular context profile that is both relevant and falls within a threshold latency budget.

In some examples, the context generation system may pre-select one or more context profiles based on historical data collective over performing a number of previous queries. For example, the context generation system may maintain a profile database of historical relevancy scores of various context profiles. When the context generation system receives a query, the context generation system may compare the query and the associated context with the profile database. The context generation system may determine a context profile by pre-selecting one or more context profiles that is predicted to generate a relevant response within a threshold latency. This pre-selection of context can significantly reduce utilization of processing resources on the cloud and/or on client devices.

The context generation system may additionally be implemented in a flexible manner that facilitates offloading processing to different computing environments. For example, in one or more implementations described herein, the context generation system facilitates offloading context generation to an edge network while the act of applying the more robust foundation model can be performed on a datacenter on a cloud computing system. In one or more embodiments, context selection or generation may be performed in part on a client device and/or on an edge network in a manner that provides faster latency and facilitates generation of a response to an input query within a limited latency budget.

As illustrated by the foregoing discussion, the present disclosure utilizes a variety of terms to describe features and advantages of the context generation system. Additional detail is now provided regarding the meaning of a number of these terms.

For example, as used herein, a "foundation model" refers to an AI or ML model that is trained to generate an output in response to an input based on a large dataset. A foundation model may include a neural network having a significant number of parameters (e.g., billions of parameters) that the foundation model can consider in performing a task or otherwise generating an output based on an input. In one or more embodiments described herein, a foundation model is trained to generate a response to a query. In some implementations, a foundation model refers to a large language model (LLM). The foundation model be trained in pattern recognition and text prediction. For example, the foundation model may be trained to predict the next word of a particular sentence or phrase. In one or more implementations described herein, the foundation model refers specifically to an LLM, though other types of foundation models may be used in generating responses to input queries. Indeed, while one or more embodiments described herein refer to features associated with determining context for an LLM, similar features may apply to determining and/or generating context for other types of foundation models.

As used herein, the term "compressed foundation model" or "compressed model" refers to a reduced version of a foundation model having fewer parameters than an associated non-compressed model. For example, a compressed foundation model may be trained to perform the same or similar task or function as a corresponding non-compressed foundation model (or simply "foundation model") while using fewer parameters. For example, as will be discussed herein, a foundation model may prepare responses to queries that are not as in-depth, relevant, or accurate, but may provide a relevancy score that is used to predict a relevancy score for a from a non-compressed foundation model in the event that a similar or identical input is provided to the non-compressed version of the foundation model.

As used herein, "context" may be information that may be used by a foundation model or other machine learning model that directs the model to generate a relevant or more accurate response to a query. Context information may include information related to the query that is not directly stated in the query. For example, in one or more embodiments described herein, context is information generated based on text similarity metrics between a query and a database of additional information (e.g., domain-specific information). As will be discussed in further detail below, context information may be identified through a variety of mechanisms. For example, context information may be identified using a variety of different text similarity metrics. Determining a text similarity metric may involve comparing text of the query to the text of one or more documents in a context database or a domain-specific database. Text similarity metrics may be generated using any number of techniques. For instance, text similarity metrics may refer to different types of similarity metrics including, by way of example and not limitation, cosine similarity, Jaccard index, L2 norm, Loo norm, inverted file index, Hamming distance, any other text similarity metric, and combinations thereof. In some examples, context information may be generated using vector embeddings. In some examples, context information may include and/or be generated using plugins to the context database.

As used herein, a "context profile" may be a particular combination of one or more techniques used to generate context. For example, a context profile may refer to context that is generated based on a particular text similarity metric. In some examples, a context profile may include a particular vector embedding format. In some examples, a context profile may include a particular plugin relevant to the domain of the context database. In some examples, a context profile may include a combination of techniques to generate context, including one or more of a text similarity metric, a vector embedding, or a plugin. In some examples, a context profile may include multiple elements of a technique, such as multiple text similarity metrics, multiple vector embedding formats, multiple plugins, and combinations thereof.

As used herein, an "edge network" or "edge data center" may refer interchangeably to an extension of the cloud computing system located on a periphery of the cloud computing system. The edge network may refer to a hierarchy of one or more devices that provide connectivity to devices and/or services on a datacenter within a cloud computing system framework. An edge network may provide a number of cloud computing services on hardware having associated configurations in force without requiring that a client communicate with internal components of the cloud computing infrastructure. Indeed, edge networks provide virtual access points that enables more direct communication with components of the cloud computing system than another entry point, such as a public entry point, to the cloud computing system.

FIG. 1 is a representation of a computing system 100, according to at least one embodiment of the present disclosure. The computing system 100 may host or implement a foundation model 102. The foundation model 102 may be accessible over the Internet or other communication network (e.g., a 5G telecommunications network, cloud computing network, edge network). By way of example, the foundation model 102 may located on a cloud-computing network 101 that is accessible over the Internet. In some embodiments, some or all of the foundation model 102 may be located on an edge network of the cloud.

The foundation model 102 may be trained in accordance with information on a domain database 115. In some embodiments, the entire domain database 115 used to train the foundation model 102 is implemented on and/or accessible over the Internet. In some embodiments, at least a portion of the domain database is be stored on the same server and/or at the same location as the foundation model 102 and accessible over a local network. In some embodiments, at least a portion of the domain database 115 is located at the edge network on which the foundation model 102 is located.

A user may access the foundation model 102 through a user device 108. The user may generate a query on the user device 108. The foundation model 102 may receive the query over a network. The foundation model 102 may prepare a response to the query based on the information in the domain database 115.

The computing system 100 includes one or more computing devices 103 that may host a context extraction system 110. In some embodiments, the context extraction system 110 receives the query from the user device 108. The context extraction system 110 may be in communication with the foundation model 102. In some embodiments, the context extraction system 110 is in direct communication with the foundation model 102. For example, the context extraction system 110 may be located on the same local network, edge network, and/or datacenter of a cloud-computing network 101 as the foundation model 102. In some embodiments, the context extraction system 110 is in communication with the foundation model 102 over the Internet. In some embodiments, the context extraction system 110 is located on the user device 108. For example, the context extraction system 110 may be part of an application on the user device 108. In some examples, the context extraction system 110 may be at least partially located on the cloud and/or the edge network.

The context extraction system 110 may determine a context profile from the query. For example, the context extraction system 110 may generate a context profile based on content from the domain database 115 and text from the query. In some examples, the context extraction system 110 may select a context profile from a profile database of context profiles. The context extraction system 110 may generate a prompt for the foundation model 102 using the context information from the context profile and the query. For example, the context extraction system 110 may generate a text concatenation of the query and the context information from the context profile to generate the prompt. The foundation model 102 may prepare a response to the query based on the inputted prompt and send the response back to the user device 108. Additional information in connection with steps of the above-process will be discussed in further detail below.

As discussed in further detail herein, the context extraction system 110 may generate multiple context profiles. The context extraction system 110 may analyze the multiple context profiles and identify a best context profile for the foundation model 102 to utilize. For example, the context extraction system 110 may iteratively analyze multiple context profiles until the context extraction system 110 identifies a context profile having a relevancy or relevancy score that is greater than or equal to a threshold relevancy. The context extraction system 110 may select the best context profile and prepare a prompt for the foundation model 102 using the best context profile.

In some examples, the context extraction system 110 may simultaneously analyze multiple context profiles in parallel (e.g., any number of context profiles). The context extraction system 110 may prepare relevancy scores for each of the context profiles. The context extraction system 110 may select the context profile having the higher relevancy score (or a relevancy score that exceeds a threshold and having a lower expected latency). The context extraction system 110 may then send the prompt based on the best context profile to the foundation model 102.

In some embodiments, the context extraction system 110 analyzes the context profiles by running the prompts based on each of the context profiles through the foundation model 102. This may generate the entire answer to the query for each context profile. In some embodiments, the context extraction system 110 analyzes the context profiles by running the prompts through a compressed foundation model. The compressed foundation model may generate a relevancy score that is based on a lower cost analysis of the query, while still indicative of which of the context profiles is best or which of the context profiles exceeds a threshold.

In some embodiments, the context extraction system 110 includes a profile database. The profile database may include a record of multiple context profiles associated with queries. When the context extraction system 110 receives a query from a user, the context extraction system 110 may determine which of the context profiles in the profile database may generate an answer that is above the relevance threshold for relevance. The context extraction system 110 may select one or more of the context profiles for the foundation model 102 to process. In this manner, the context extraction system 110 may determine which of the context profiles that the foundation model 102 uses to prepare a response to the query.

In accordance with at least one embodiment of the present disclosure, the context extraction system 110 may determine which of the context profiles in the profile database may be the most relevant to a particular query using empirical data. For example, as the foundation model 102 answers queries using a particular context profile, the context extraction system 110 may record in the profile database the relevance scores associated with the context profile. The context extraction system 110 may utilize the profile database to provide and/or recommend better context profiles to answer the query.

Figure 2:
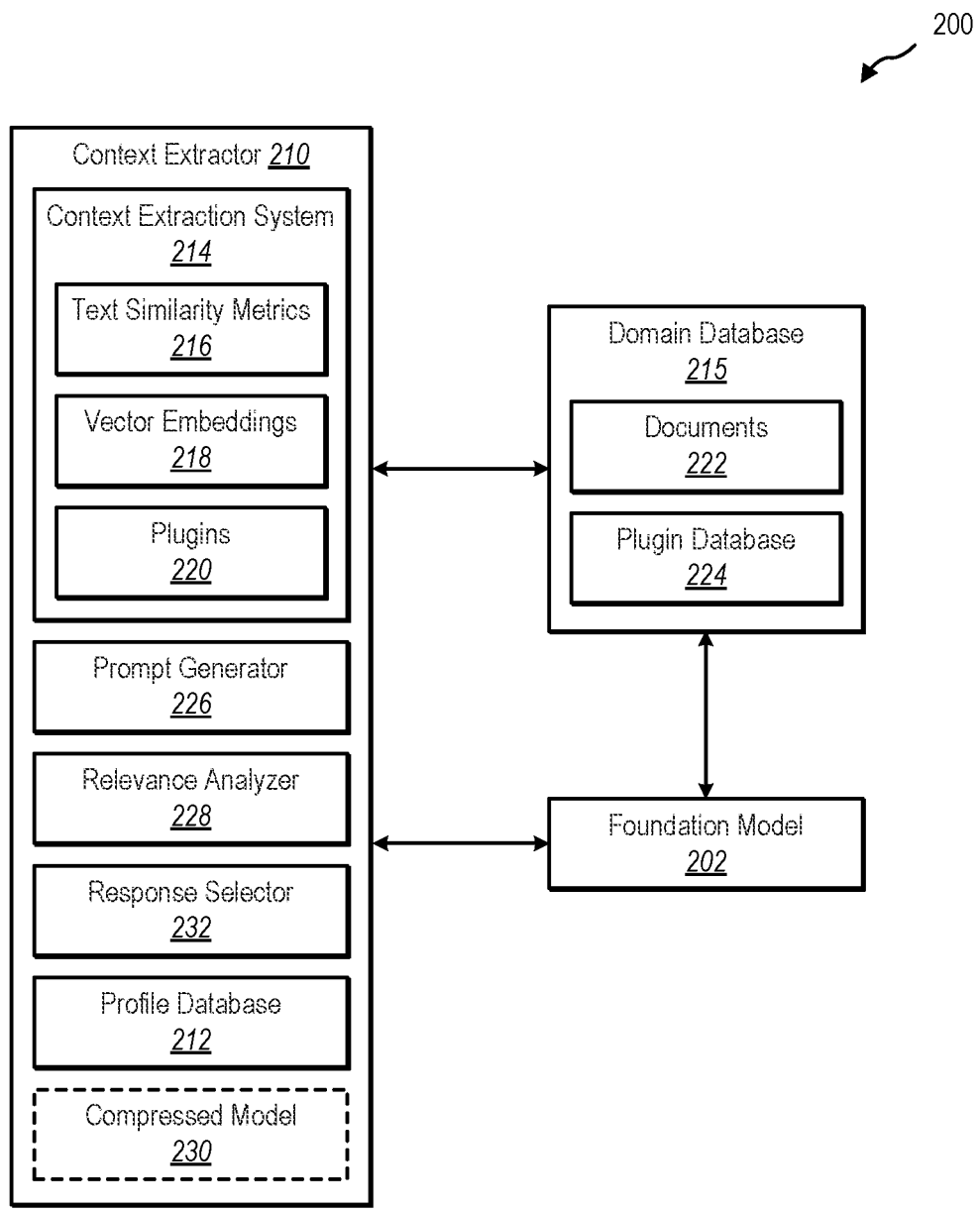
FIG. 2 illustrates an example implementation of a context extraction system on a server device in accordance with one or more embodiments.

FIG. 2 is a representation of computing system 200, according to at least one embodiment of the present disclosure. Each of the components of the computing system 200 can include software, hardware, or both. For example, the components can include one or more instructions stored on a computer-readable storage medium and executable by processors of one or more computing devices, such as a client device or server device. When executed by the one or more processors, the computer-executable instructions of the computing system 200 can cause the computing device(s) to perform the methods described herein. Alternatively, the components can include hardware, such as a special-purpose processing device to perform a certain function or group of functions. Alternatively, the components of the computing system 200 can include a combination of computer-executable instructions and hardware.

Furthermore, the components of the computing system 200 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

In accordance with at least one embodiment of the present disclosure, the computing system 200 includes a context extractor 210, a domain database 215 in communication with the context extractor 210, and a foundation model 202 in communication with the domain database 215 and the context extractor 210. The context extractor 210 includes a context extraction system 214. The context extraction system 214 may extract context from the domain database 215 based on the query using one or more of a variety of context extraction techniques. For example, the context extraction system 214 may utilize text similarity metrics 216, vector embeddings 218, plugins 220, any other context extraction technique, and combinations thereof to generate context for the query. In some embodiments, the context extraction system 214 extracts a context profile that includes context information from the text similarity metrics 216, the vector embeddings 218, the plugins 220, any other context extraction technique, and combinations thereof.

The domain database 215 may be the database from which context for the context profiles is extracted. In some embodiments, the foundation model 202 is trained by information in the domain database 215. In some embodiments, the domain database 215 refers to the entirety of a domain-specific database used to train the foundation model 202. In some embodiments, the domain database 215 includes a subset of information used to train the foundation model 202.

The domain database 215 may include context documents 222. The context documents 222 may be any type of document used by the context extraction system 214 to generate context. For example, the context documents 222 may include documents accessible over the Internet, documents saved locally at the context extractor 210 and/or at a local database, documents relevant to context for the foundation model 202, documents relevant to the focus (if any) of the foundation model 202, any other context documents, and combinations thereof. In some embodiments, the context extraction system 214 may apply the text similarity metrics 216 to the context documents 222 in the domain database 215. The context extraction system 214 may generate the context profile using the context generated by the text similarity metrics 216 analyzing text similarities between the query and the context documents 222.

The domain database 215 may include a plugin database 224. The plugin database 224 may include a database of any plugins that are usable by the foundation model 202. Plugins may be used to focus the foundation model 202 on a particular search and/or provide context during the process of generating a context profile. For example, a plugin may include a particular website or a particular company's publicly available information. As an exemplary non-limiting example, a plugin may include information from the website YELP. When a user enters a query asking for the best restaurants, the foundation model 202 may utilize the information from YELP to prepare the response. When the context extractor 210 receives the query asking for the best restaurants, the context extraction system 214 may identify the plugin 220 for YELP from the plugin database 224. This may help to focus the search of the foundation model 202 to a relevant website, thereby reducing the cost of the foundation model 202 search.

The context extractor 210 may include a prompt generator 226. The prompt generator 226 may utilize the query and the context information to generate a prompt to be inputted into the foundation model 202. The prompt generator 226 may generate the prompt for use by the foundation model 202 in any manner. For example, the prompt generator 226 may prepare a string concatenation of the query and the context information. In some examples, the prompt generator 226 may generate a prompt as a script or generate instructions for the foundation model 202 in a scripting language. In some examples, the prompt generator 226 may prepare entries for entry forms for a foundation model 202. In some examples, the prompt generator 226 may generate a prompt that is focused on and/or specialized for a particular foundation model 202, such as using a particular syntax.

The context extractor 210 may include a relevance analyzer 228. The relevance analyzer 228 may analyze each of the context profiles to determine a relevance score for the context profile. The relevance analyzer 228 may determine the relevance score for the context profile in any manner. For example, the relevance analyzer 228 may determine the relevance score for the context profile based on the detail and/or content of the context profile compared to the query. In some examples, the relevance analyzer 228 may determine the relevance score for the context profile based on the resulting response to the query from the foundation model 202. To analyze the relevance using the context profile, the relevance analyzer 228 may analyze the context documents 222 used by the text similarity metrics 216 and/or the vector embeddings 218 in the context profile. In some examples, to analyze the relevance using the context profile, the relevance analyzer 228 may analyze the plugin database 224 identified using the plugins 220 of the context extraction system 214.

In some examples, the relevance analyzer 228 may determine the relevance score for the context profile based on an initial response to the query. For example, a compressed foundation model 230 may prepare an initial response to the query using the prompts from the prompt generator 226. The relevance analyzer 228 may analyze the initial responses from the compressed foundation model 230 and determine how relevant the response is to the query.

The context extractor 210 may include a response selector 232. The response selector 232 may analyze the relevancy scores from the relevance analyzer 228 to select a best context profile. In some embodiments, a context profile is selected based on the context profile having a higher relevancy score (e.g., having a higher relevancy score than other context profiles and/or a relevancy score above a threshold while having a lower latency than other context profiles). In some embodiments, the best context profile is the context profile that has a relevancy score above a relevancy threshold that has the lowest cost (e.g., a lowest expected latency budget). For example, multiple analyzed context profiles may have a relevancy score that is greater than the relevancy threshold. To reduce processing of the foundation model, the response selector 232 may select the context profile having the lowest cost.

In accordance with at least one embodiment of the present disclosure, the context extractor 210 analyzes multiple context profiles for a single query. In some embodiments, the foundation model 202 has a latency budget. The latency budget may be the amount of time the foundation model 202 has to prepare a response to the query. The latency budget may include transmission time between the user device and the foundation model 202 over the internet or a local network. In some examples, the latency budget may include processing time for the foundation model 202. In some examples, the latency budget may include a specific amount of time to identify and select the best context profile.

As discussed herein, the context extractor 210 may include a profile database 212. When the context extractor 210 prepares and analyzes a context profile the context extractor 210 may save the resulting cost, context information, relevancy score, query, prompt, any other information, and combinations thereof, to the profile database 212. Over time, as the context extractor 210 processes queries for the foundation model 202, the profile database 212 may include multiple relevancy scores for particular queries and/or context profiles.

In accordance with at least one embodiment of the present disclosure, when the context extractor 210 receives a query, the context extractor 210 determines which context profiles may have a higher likelihood of having a relevancy score above the relevancy threshold (and/or higher than other generated context profiles). For example, the context extractor 210 may analyze the profile database 212 to identify context profiles that have previously been used to answer related queries. The context extractor 210 may empirically determine which of the context profiles are associated with a high relevancy score and/or a low processing cost. In some embodiments, the context extractor 210 may empirically determine which of the context profiles are associated with a ratio of relevancy score to processing cost.

To prepare the context profiles for a particular query, the context extractor 210 may select the queries from the profile database 212 that may be analyzed by the context extractor 210. In some embodiments, pre-selecting one or more of the context profiles analyzed by the context extractor 210 helps to reduce the processing cost of analyzing the context profiles. In some embodiments, pre-selecting one or more of the context profiles analyzed by the context extractor 210 helps to identify the best context profile while reducing the total number of context profiles analyzed. For example, a context profile in the profile database 212 that has a low stored relevancy score may not be analyzed because there is a very low likelihood that the context profile will have a relevancy score above the threshold. In some examples, a context profile in the profile database 212 that has a stored relevancy score close to the relevancy threshold may be analyzed by the context extractor 210 to determine whether the relevancy score is actually above the relevancy threshold.

Figure 3:
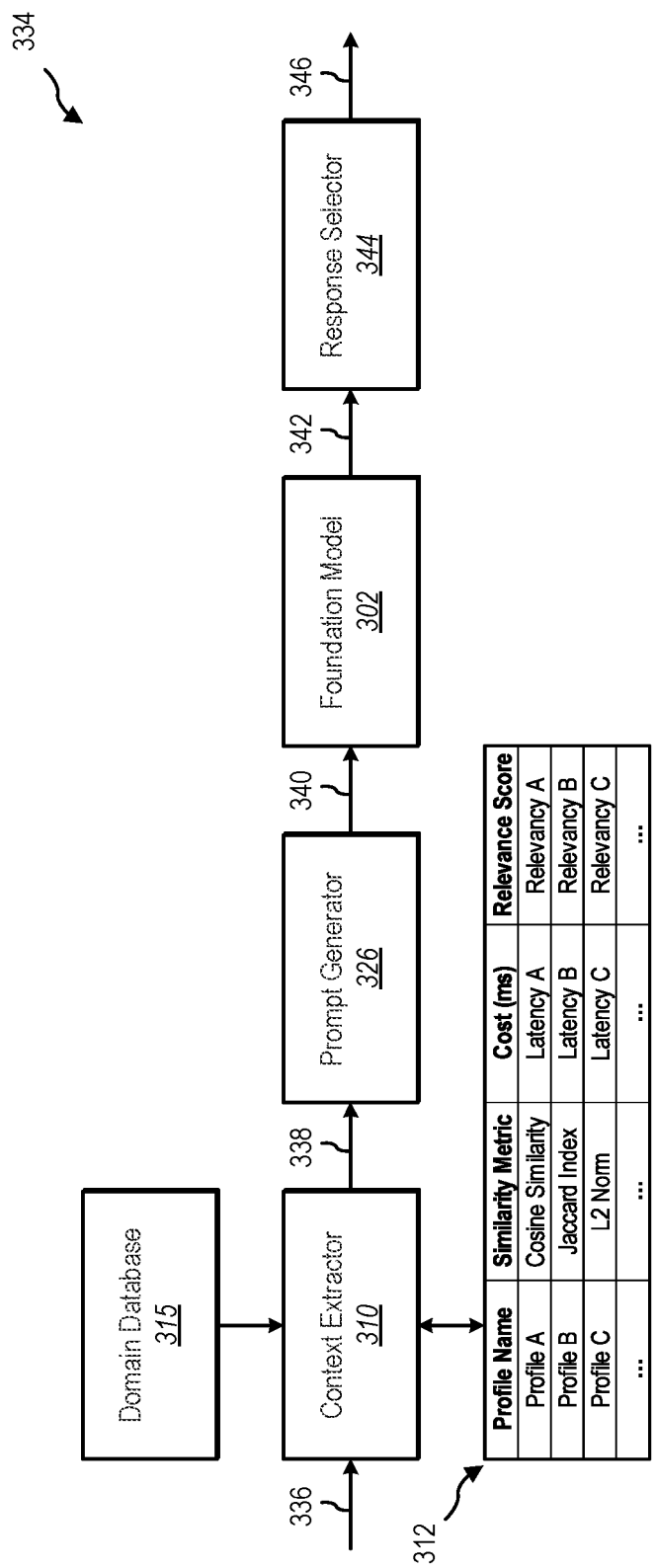
FIG. 3 illustrates an example workflow showing an example implementation of the context extraction system in accordance with one or more embodiments.

FIG. 3 is a schematic representation of a context analysis system 334, according to at least one embodiment of the present disclosure. The context analysis system 334 may include a context extractor 310. The context extractor 310 may receive a query 336. The context extractor 310 may analyze the query 336 and, using a context database 315, prepare a plurality of context profiles 338. A prompt generator 326 may receive the query 336 and the context profiles 338 and prepare a plurality of prompts 340. A foundation model 302 may receive the prompts 340 and generate responses 342 for each of the prompts. Each of the responses 342 may have an associated relevancy score. A response selector 344 may select a best response 346 of the responses 342 and transmit the best response to the user.

The context analysis system 334 may generate and analyze multiple context profiles to generate the best response 346 having the lowest cost that is above a relevancy threshold. As discussed herein, the context analysis system 334 may analyze the context profiles 338 in any manner. For example, the context analysis system 334 may analyze the context profiles 338 iteratively until a context profile having a relevancy score above the relevancy threshold is reached. In some examples, the context analysis system 334 may analyze the context profiles 338 in parallel and select the context profile having a relevancy score that is above the relevancy threshold. In some examples, the context analysis system 334 may identify multiple responses 342 that have a relevancy score above the relevancy threshold. The response selector 344 may select the best response 346 that has the lowest cost of all of the responses 342 that have a relevancy score above the threshold relevancy score.

In accordance with at least one embodiment of the present disclosure, the context analysis system 334 may analyze the context profiles 338 in parallel. For example, the context extractor 310 may extract a plurality of context profiles for the 336 and submit all of the context profiles to the prompt generator 326 in parallel. The prompt generator 326 may generate prompts 340 based on all the context profiles 338 and send all of the prompts 340 to the foundation model 302. The foundation model 302 may analyze all of the prompts 340 and send all of the responses 342 to the response selector 344. The response selector 344 may analyze all of the responses 342 and select the best response 346 from the list of responses 342.

In some embodiments, the context extractor 310 prepares the context profiles 338 based on the latency budget. Each of the context profiles 338 may have an associated cost, and the cost may include a latency cost. The context extractor 310 may prepare the context profiles 338 so that the processing of the context profiles 338, including profile generation, prompt generation, foundation model 302 analysis, and response selection, may occur within the latency budget.

In some embodiments, the context analysis system 334 iteratively analyzes sets of context profiles 338. For example, the context extractor 310 may generate a first set of context profiles 338. The context analysis system 334 may analyze the first set of context profiles 338. If a best response 346 cannot be selected, then the context analysis system 334 may cause the context extractor 310 to generate a second set of context profiles 338, and the context analysis system 334 may analyze the second set of context profiles 338 to determine whether a best response 346 may be determined. This process may be repeated until a best response 346 may be selected.

As discussed herein, the context extractor 310 may be in communication with a profile database 312. The profile database 312 may include a record of historically-used context profiles, such as context profile A, context profile B, context profile C, and so forth. The context profiles in the profile database 312 may include details about the context profile. For example, each context profile in the profile database 312 may include the technique used to extract the context, such as the similarity metric, the vector embedding, the plugin, any other technique, and combinations thereof.

The profile database 312 may further include the cost associated with the particular context profile. In the embodiment shown, the cost is illustrated as a latency cost. For example, each of the context profiles in the profile database 312 may have an associated latency cost to extract the context. But it should be understood that the cost may be any type of cost, such as a processor capacity cost, a transmission bandwidth cost, a financial cost, any other cost, and combinations thereof.

The profile database 312 may further include a relevancy score associated with each of the context profiles. For example, each of the context profiles may include a relevancy score that is associated with the particular context extraction techniques. In some examples, the relevancy score may be an estimated relevancy score. In some embodiments, the relevancy score is based on previous uses of a particular context profile. For example, the context analysis system 334 may record each of the context profiles 338 used to generate the best response 346 in the profile database 312 along with their respective relevancy scores. The relevancy score listed in the profile database 312 may include an average relevancy score for multiple uses of the associated context profile. In some embodiments, the relevancy score is associated with a particular query, a query type, a subject matter of the query, or other query-based metrics.

As the context analysis system 334 analyzes queries, the profile database 312 may include a record of each of the context profiles used. The context extractor 310 may select context profiles from the profile database 312 based on the anticipated relevancy score in the profile database 312. In this manner, the context extractor 310 may use historical relevancy data for the context profiles to determine the context profiles that are most likely to result in a relevancy score for a particular query 336 that is above the relevancy threshold.

Figure 4:
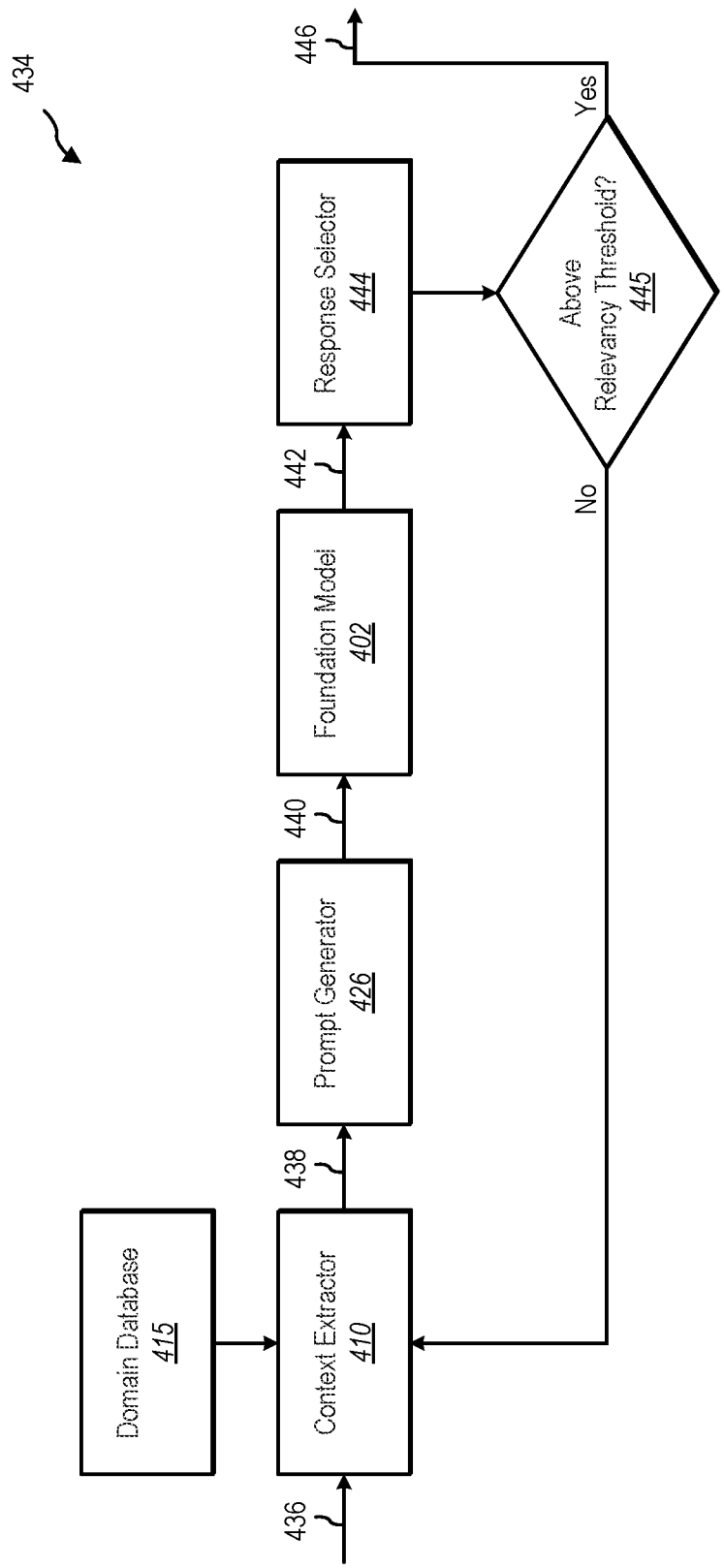
FIG. 4 illustrates another example workflow showing an example implementation of the context extraction system in accordance with one or more embodiments.

FIG. 4 is a schematic representation of a context analysis system 434, according to at least one embodiment of the present disclosure. The context analysis system 434 may include a context extractor 410. The context extractor 410 may receive a query 436. The context extractor 410 may analyze the query 436 and, using a context database 415, prepare a context profile 438. A prompt generator 426 may receive the query 436 and the context profile 438 and prepare a prompt 440. A foundation model 402 may receive the prompt 440 and generate a response 442 for the prompts.

The response 442 may have an associated relevancy score. A response selector 444 may review the response 442 and determine 445 whether the responses 442 is above the response threshold. If the response 442 is above the response threshold, then the response selector 444 may submit the response 442 to the user. If the response 442 is not above the response threshold, then the response selector 444 may request that the context extractor 410 generate a new context profile. The context extractor 410 may generate a new context profile 438, the prompt generator 426 may generate a new prompt 440, and the foundation model 402 may generate a new response 442. In this manner, the context analysis system 434 may iteratively prepare responses to the query 436 until the response selector 444 identifies a response that is above the relevancy threshold. When the response selector 444 identifies a response that is above the relevancy threshold, the response selector 444 may select that response as a best response 446.

In accordance with at least one embodiment of the present disclosure, the first context profile 438 generated by the context extractor 410 is a low-cost context profile 438. Subsequent context profiles 438 may be incrementally higher in cost until the response selector 444 identifies the response 442 that has a relevancy score that is greater than the relevancy threshold. This may help to identify the context profile 438 that has the overall lowest cost.

In some embodiments, the first context profile 438 generated by the context extractor 410 is not the lowest cost context profile 438. The context profile 438 may generate a context profile based on other factors. For example, the context profile 438 may generate a context profile from a profile database. The context extractor 410 may select the first context profile 438 based on a profile selection criteria, such as relevancy score, a cost, or other profile selection criteria. In some examples, the context extractor 410 may select subsequent context profiles 438 that prioritize higher relevancy scores, lower costs, a particular context extraction technique, any other metric, and combinations thereof.

In some embodiments, the context analysis system 434 iteratively analyzes context profiles 438 until the response selector 444 identifies the first response 442 having a relevancy score above the relevancy threshold. In some embodiments, the context analysis system 434 iteratively analyzes context profiles 438 until a latency budget has expired. In some embodiments, the context analysis system 434 iteratively analyzes context profiles until the latency budget has expired, and if no response 442 has a relevancy score above the relevancy threshold, the context analysis system 434 may continue to iteratively analyze context profiles 438 until the relevancy threshold is met.

Figure 5:
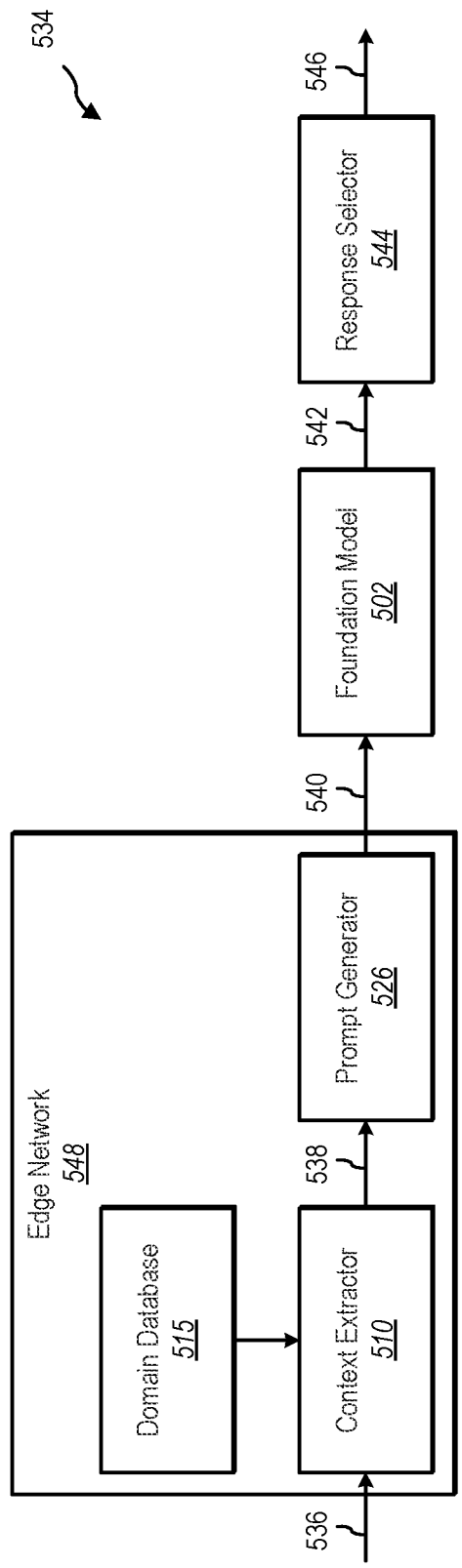
FIG. 5 illustrates an example implementation of the context extraction system including one or more components implemented on an edge network.

FIG. 5 is a schematic representation of a context analysis system 534, according to at least one embodiment of the present disclosure. The context analysis system 534 may include a context extractor 510. The context extractor 510 may receive a query 536. The context extractor 510 may analyze the query 536 and, using a context database 515, prepare a plurality of context profiles 538. A prompt generator 526 may receive the query 536 and the context profiles 538 and prepare a plurality of prompts 540. A foundation model 502 may receive the prompts 540 and generate responses 542 for each of the prompts. Each of the responses 542 may have an associated relevancy score. A response selector 544 may select a best response 546 of the responses 542 and transmit the best response to the user.

In accordance with at least one embodiment of the present disclosure, at least a portion of the context analysis system 534 is offloaded to a cloud network or an edge network 548. In some situations, processing of the query may occupy valuable processing power on a user's device. This may reduce the capacity of the user device to perform other computing processes and/or drain the battery of the user device. Offloading at least a portion of the context analysis system 534 to the edge network 548 may help to reduce the processing that occurs on the user device.

In the embodiment shown, context selection by the context extractor 510 and prompt generation by the prompt generator 526 are offloaded to the edge network 548. However, it should be understood that any portion of the context analysis system 534 may be offloaded to the edge network 548. For example, the context database 515, or at least a portion of the context database 515 may be stored on the edge network 548. In some examples, the foundation model 502, or at least a portion of the foundation model 502 may be located on the edge network 548. For example, an initial reviewing portion of the foundation model 502 may be located on the edge network 548. In some examples, the response selector 544 may be located on the edge network 548. In some embodiments, the entire context analysis system 534 may be located on the edge network 548.

In some embodiments, one or more of the processes of the context analysis system 534 may be performed on an edge network of a cloud computing system (e.g., an edge of a telecommunications network). For example, determining the plurality of context profiles may be performed on a server device on an edge network of a fifth generation (5G) telecommunications environment. The foundation model may be implemented on a datacenter of a cloud computing system accessible via the edge network.

Figure 6:
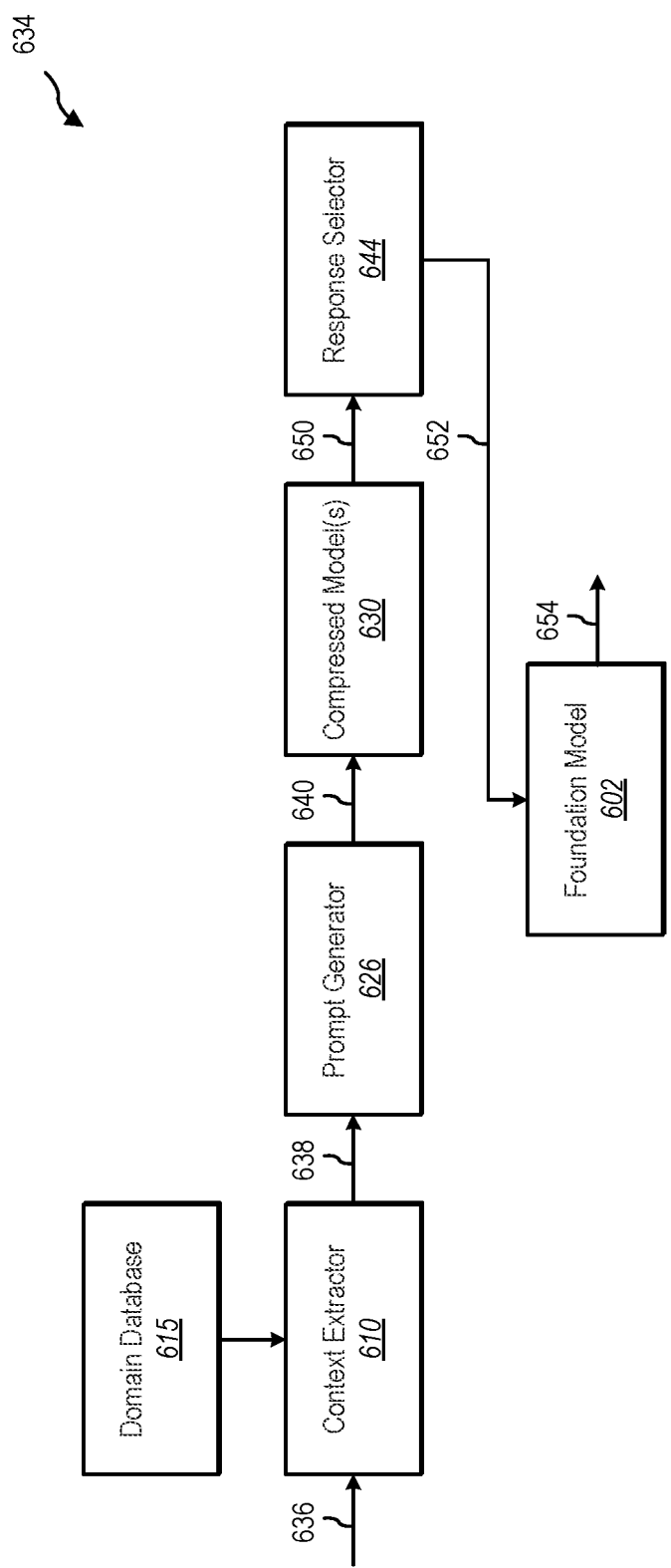
FIG. 6 illustrates an example implementation of the context extraction system that makes use of a compressed foundation model in accordance with one or more embodiments.

FIG. 6 is a schematic representation of a context analysis system 634, according to at least one embodiment of the present disclosure. The context analysis system 634 may include a context extractor 610. The context extractor 610 may receive a query 636. The context extractor 610 may analyze the query 636 and, using a context database 615, prepare a plurality of context profiles 638. A prompt generator 626 may receive the query 636 and the context profiles 638 and prepare a plurality of prompts 640.

In accordance with at least one embodiment of the present disclosure, one or more compressed foundation model(s) 630 receives the prompts 640. The compressed foundation model(s) 630 may prepare a plurality of initial responses 650 to the query 636. As discussed herein, the compressed foundation model(s) 630 may be a version of a foundation model 602 that utilized fewer connection and/or has a lower complexity. The compressed foundation model(s) 630 may generate answers that are lower cost than the foundation model 602. In some embodiments, the compressed foundation model(s) 630 may generate an initial response 650 for each of the context profiles 638. The initial response 650 may be a response that is not as complete a response as the foundation model 602 would generate, but is complete enough or good enough for analytical purposes. In one or more embodiments, the environment includes multiple compressed foundation model(s) 630 that may be run iteratively on generated prompts prior to providing a query and context to the full foundation model 602.

A response selector 644 may analyze the initial responses 650 and determine a best initial response 652 from the initial responses 650. For example, the response selector 644 may generate an initial relevancy score for each of the initial responses 650. Based on the initial relevancy scores, the response selector 644 may generate the best initial response 652. The response selector 644 may send the best initial response 652, including the associated context profile 638 and prompt 640. The foundation model 602 may generate a full response 654 to the query 636 and send the full response 654 to the user. In this manner, the compressed foundation model(s) 630 may help to reduce the processing load and/or cost of the context analysis system 634.

As discussed in further detail herein, the compressed foundation model(s) 630 may be utilized when the context analysis system 634 processes the context profiles 638 iteratively and/or in parallel. For example, when iteratively analyzing the context profiles 638, the compressed foundation model(s) 630 may iteratively prepare the initial responses 650 to the query. This may help to reduce the cost of each of the iterations, thereby allowing more iterations to be performed before reaching the latency budget. In some examples, the compressed foundation model(s) 630 may analyze in parallel each of the context profiles 638. This may allow the compressed foundation model(s) 630 to analyze more context profiles 638 in parallel to determine the best response to the query.

Figure 7:
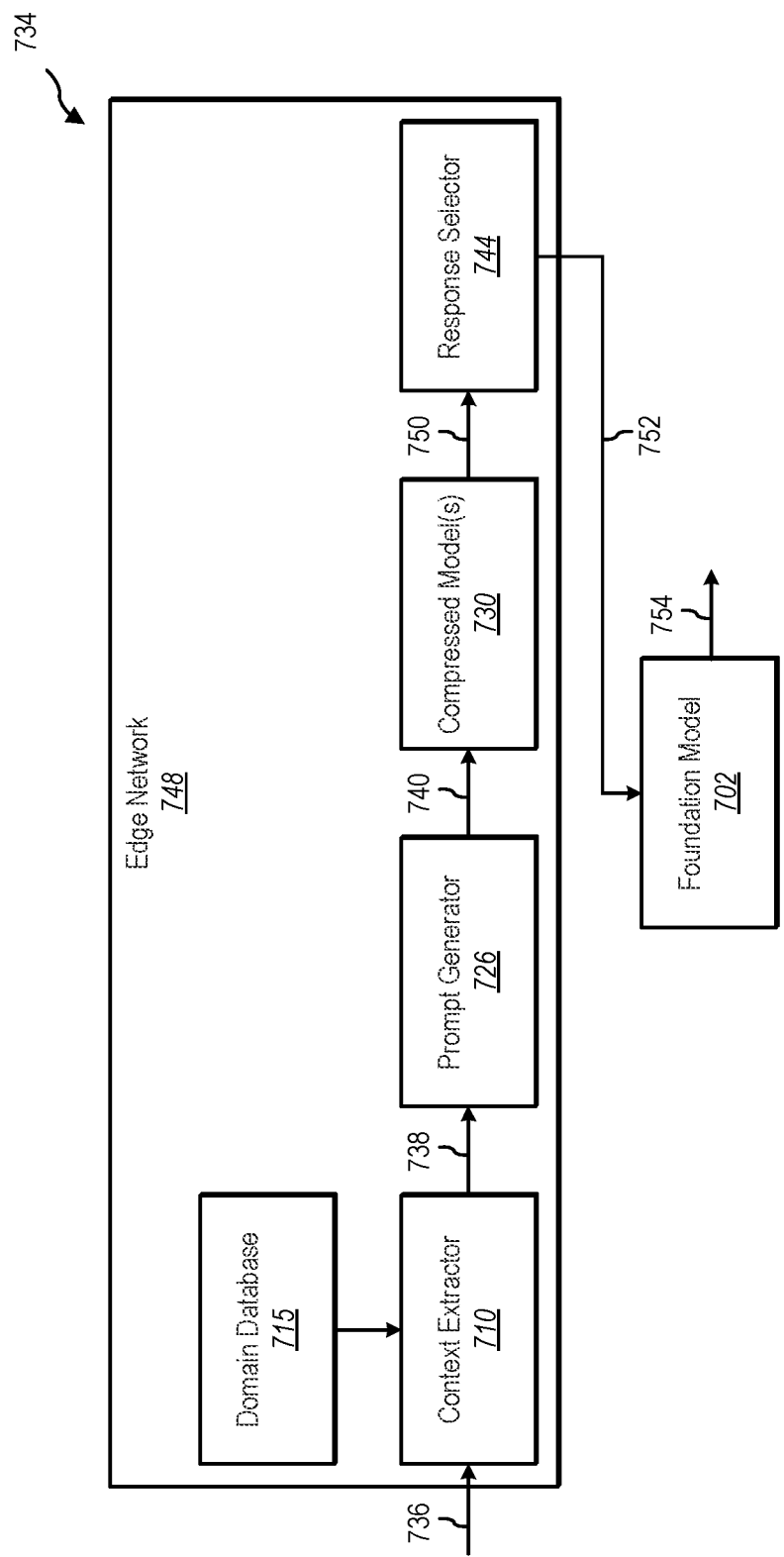
FIG. 7 illustrates another example implementation of the context extraction system including one or more components implemented on an edge network.

FIG. 7 is a schematic representation of a context analysis system 734, according to at least one embodiment of the present disclosure. The context analysis system 734 may include a context extractor 710. The context extractor 710 may receive a query 736. The context extractor 710 may analyze the query 736 and, using a context database 715, prepare a plurality of context profiles 738. A prompt generator 726 may receive the query 736 and the context profiles 738 and prepare a plurality of prompts 740.

In accordance with at least one embodiment of the present disclosure, one or multiple compressed foundation model(s) 730 receives the prompts 740. The compressed foundation model(s) 730 may prepare a plurality of initial responses 750 to the query 736. As discussed herein, the compressed foundation model(s) 730 may be a version of a foundation model 702 that utilized fewer connection and/or has a lower complexity. The compressed foundation model(s) 730 may generate answers that have lower processing and latency cost than the foundation model 702. In some embodiments, the compressed foundation model(s) 730 may generate an initial response 750 for each of the context profiles 738. The initial response 750 may be a response that is not as complete a response as the foundation model 702 would generate, but is complete enough or good enough for analytical purposes.

In accordance with at least one embodiment of the present disclosure, at least a portion of the context analysis system 734 may be located and/or hosted on a remote network, such as an edge network 748 as shown. As discussed herein, offloading at least a portion of the context analysis system 734 on the edge network 748 may help to reduce the processing costs on the user device.

Any portion of the context analysis system 734 may be offloaded to the context analysis system 734. For example, the compressed foundation model(s) 730 may be located on and/or hosted by the context analysis system 734. Offloading the compressed foundation model(s) 730 to the edge network 748 may allow the context analysis system 734 to process more context profiles 738. In this manner, the context analysis system 734 may generate more relevant context profiles 738 to the query 736.

Figure 8:
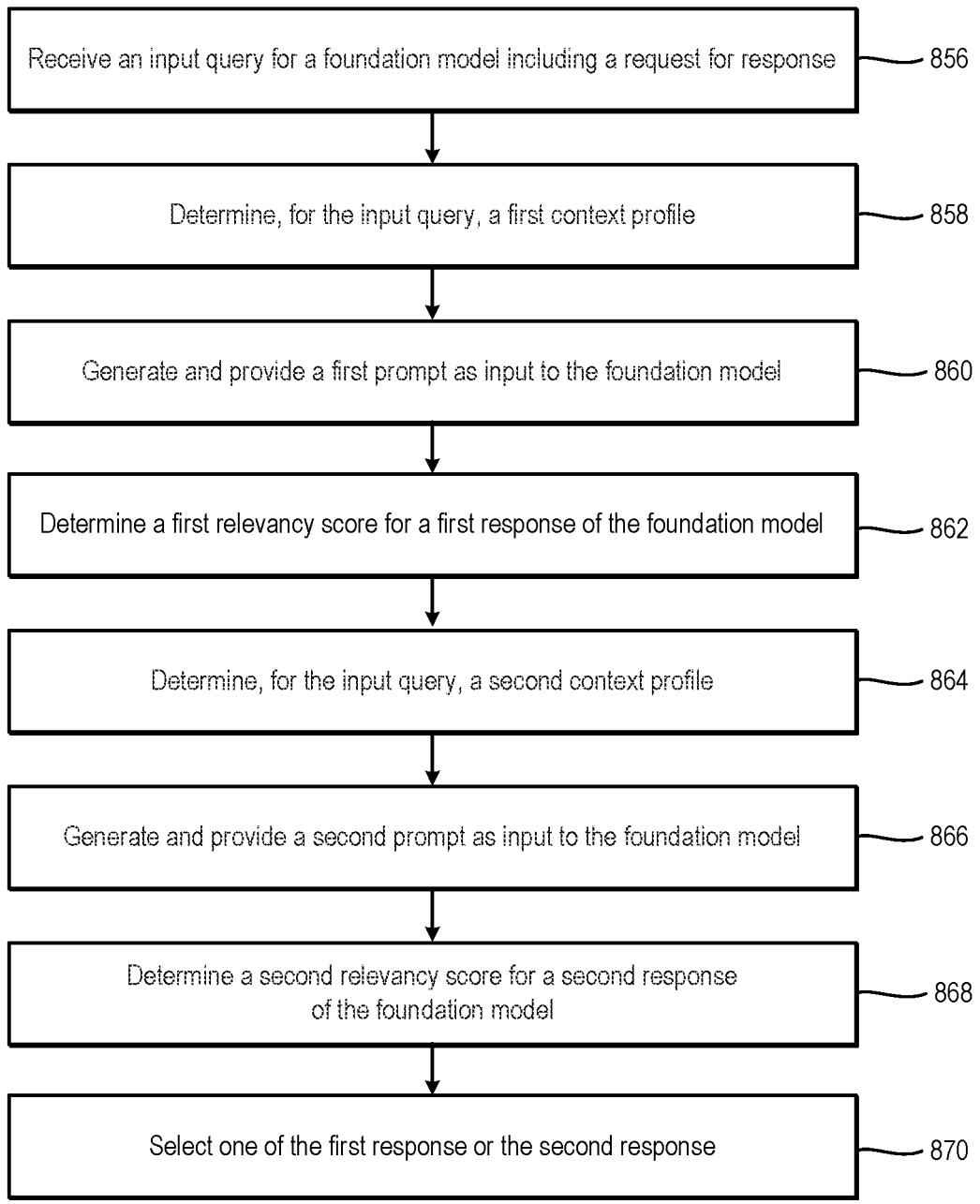
FIG. 8 illustrates a series of acts for extracting context and processing a query using a foundation model in accordance with one or more embodiments.
Figure 9:
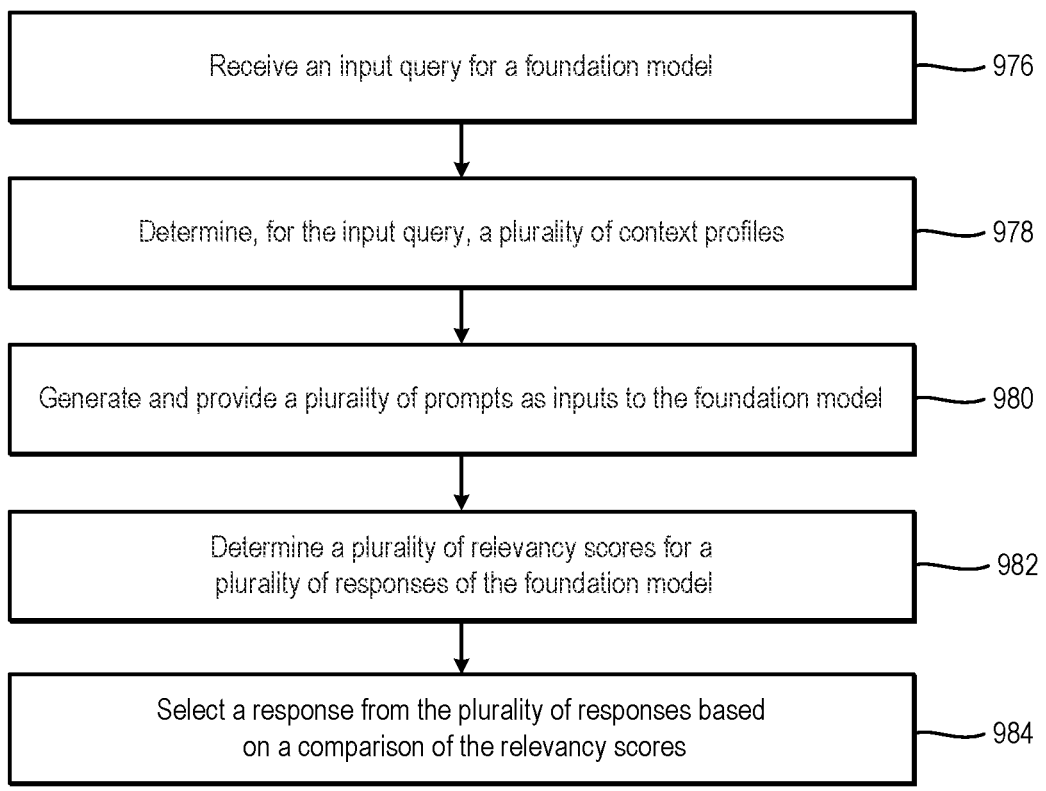
FIG. 9 illustrates another series of acts for extracting context and processing a query using a foundation model in accordance with one or more embodiments.

FIGS. 8-9, the corresponding text, and the examples provide a number of different methods, systems, devices, and computer-readable media of the context analysis system. In addition to the foregoing, one or more embodiments can also be described in terms of flowcharts comprising acts for accomplishing a particular result, as shown in FIGS. 8-9. FIGS. 8-9 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts for generating context for a foundation model, in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a computer-readable medium can comprise instructions that, when executed by one or more processors, cause a computing device to perform the acts of FIG. 8. In some embodiments, a system can perform the acts of FIG. 8.

A context analysis system may receive an input query for a foundation model at 856. The input query may include a request for a response from the foundation model. The context analysis system may determine, for the input query, a first context profile at 858. The first context profile may be based on the language of the input query and a context database. The first context profile may be generated and/or determined based on a first comparison of text similarities between the input query and content of the context database.

The context analysis system may generate and provide a first prompt as input to the foundation model at 860. The first prompt includes a first string of text based on the input query and the first context profile. The context analysis system may determine a first relevancy score for the first response of the foundation model responsive to the first prompt at 862. The first relevancy score indicates a metric of confidence that the first response is relevant to the input query.

The context analysis system may determine, for the input query, a second context profile for the query at 864. The second context profile is based on the language of the input query and the context database. The second context profile is based on a second comparison of text similarities between the input query and content of the context database. The context analysis system may generate and provide a second prompt as input to the foundation model at 866. The second prompt includes a second string of text based on the input query and the second context profile. The context analysis system may determine a second relevancy score for the second response of the foundation model responsive to the second prompt at 868. The second relevancy score indicating a metric of confidence that the second response is relevant to the input query.

In some embodiments, the context analysis system selects one of the first response or the second response based on the first relevancy score and the second relevancy score at 870. As discussed herein, the context analysis system may select the response based on the higher relevancy score. In some embodiments, the context analysis system selects the response based on the lowest cost. In some embodiments, the context analysis system selects the response based on a ratio of the relevancy score to the cost.

While FIG. 8 is described with respect to two context profiles and two responses, it should be understood that the context analysis system may prepare more than two context profiles and more than two associated responses. In some embodiments, the number of context profiles analyzed is based on the latency budget for a response to the query. In some embodiments, the number of context profiles analyzed is based on the number of context profiles it takes to reach a particular relevancy threshold. The number of context profiles analyzed may include any number of context profiles (e.g., $10s$, $100s$).

As mentioned, FIG. 9 illustrates a flowchart of a series of acts for generating context for a foundation model, in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a computer-readable medium can comprise instructions that, when executed by one or more processors, cause a computing device to perform the acts of FIG. 9. In some embodiments, a system can perform the acts of FIG. 9.

A context analysis system may receive an input query for a foundation model at 976. The input query may include a request for a response from the foundation model. The context analysis system may determine, for the input query, a plurality of context profiles based on the language of the input query at 978 As discussed herein, the context profiles may be generated based on comparisons of text similarities between the input query and content of the context database. For example, the context profiles may be generated based on at least one of text similarity metrics, vector embedding (e.g., vector embedding of the query compared to a vector representation of the context database), or a plugin of the context database. The context analysis system may generate and provide a plurality of prompts as inputs to the foundation model at 980. The plurality of prompts includes strings of text based on the input query and the plurality of context profiles.

The context analysis system may determine a plurality of relevancy scores for a plurality of responses of the foundation model responsive to the plurality of prompts at 982. The plurality of relevancy scores indicating metrics of confidence that responses from the plurality of responses are relevant to the input query. The context analysis system may select a best response of the plurality of responses based on a comparison of a relevancy score of the best response and additional relevancy scores of the plurality of relevancy scores at 984.

As discussed herein, in some embodiments, the context analysis system may offload at least a portion of the method discussed with respect to FIG. 9. For example, the context analysis system may offload extracting the plurality of context profiles and generating the plurality of prompts to an edge network. In some examples, the context analysis system may offload selection of the context profile to the edge network.

In accordance with at least one embodiment of the present disclosure, the context analysis system may apply the plurality of prompts to a compressed foundation model. The compressed foundation model may be located on the edge network. In some embodiments, the context analysis system may generate a plurality of initial relevancy scores for the plurality of initial responses. The context analysis system may select the best response by selecting a best initial response from the plurality of initial responses based on the plurality of initial relevancy scores.

In some embodiments, the context analysis system may determine to offload extracting the plurality of context profiles and generating the plurality of prompts based on processor conditions of the user device providing the query. For example, the context analysis system may determine to offload these processes if the user device does not have remaining processing capacity to extract the plurality of context profiles and/or generate the plurality of prompts within a particular latency budget.

In some embodiments, the context analysis system may extract the context profiles based on an empirical relationship in the context database. For example, after receiving the query, the context analysis system may review the context database based on the query. The context analysis system may identify empirical relationships of the context profiles related to the query in the context database to select and extract context profiles based on the empirical relationships.

In some embodiments, a number of the plurality of context profiles is based on a latency budget for the foundation model. In some embodiments, the context analysis system iteratively inputs the plurality of prompts into the foundation model as the plurality of prompts are generated. In some embodiments, the context analysis system inputs the plurality of prompts into the foundation model in parallel.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
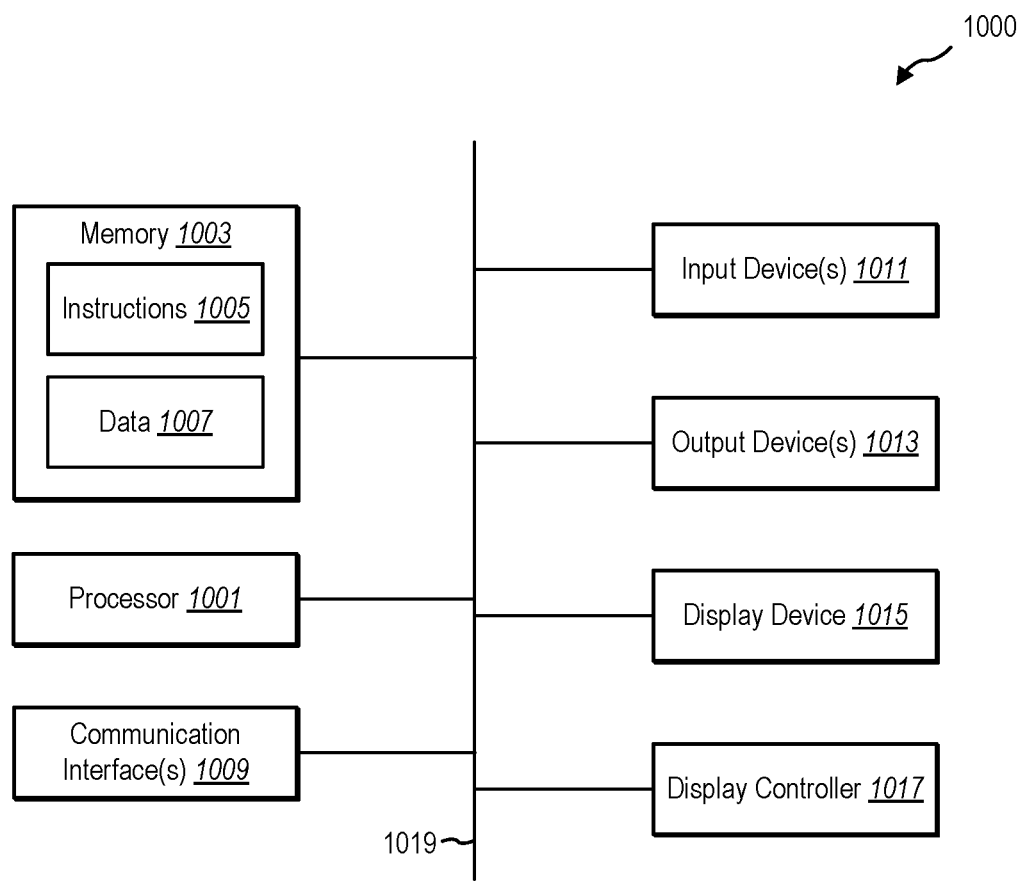
FIG. 10 illustrates certain components that may be included within a computer system.

FIG. 10 illustrates certain components that may be included within a computer system 1000. One or more computer systems 1000 may be used to implement the various devices, components, and systems described herein.

The computer system 1000 includes a processor 1001. The processor 1001 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a computing environment including a foundation model for processing queries based on context generated for the queries, a method comprising:
receiving an input query including a request for a response from the foundation model;
determining, for the input query, a first context profile based on language of the input query and a context database, the first context profile being generated based on a first comparison of text similarities between the input query and content of the context database;
generating and providing a first prompt as input to the foundation model, the first prompt including a first string of text based on the input query and the first context profile;
determining a first relevancy score for a first response of the foundation model responsive to the first prompt, the first relevancy score indicating a metric of confidence that the first response is relevant to the input query;
determining, for the input query, a second context profile based on language of the input query and the context database, the second context profile being based on a second comparison of text similarities between the input query and content of the context database;
generating and providing a second prompt as input to the foundation model, the second prompt including a second string of text based on the input query and the second context profile;
determining a second relevancy score for a second response of the foundation model responsive to the second prompt, the second relevancy score indicating a metric of confidence that the second response is relevant to the input query; and
selecting one of the first response or the second response based on the first relevancy score or the second relevancy score.

2. The method of claim 1, wherein the second context profile is generated based on the first relevancy score being less than a threshold relevancy score.

3. The method of claim 1, wherein the first context profile and the second context profile are generated and provided as inputs to the foundation model in parallel, and wherein the first relevancy score and the second relevancy score are compared upon generating the first response and the second response.

4. The method of claim 1, wherein selecting the first response or the second response includes selecting the first response based on the first response having a higher relevancy score than the second response.

5. The method of claim 4, wherein selecting the first response is further based on a latency associated with generating the first response being less than a threshold latency budget.

6. The method of claim 1,
wherein determining the first relevancy score includes providing the first prompt as input to a compressed foundation model, the compressed foundation model being a compressed version of the foundation model, and
wherein determining the second relevancy score includes providing the second prompt as input to the compressed foundation model.

7. The method of claim 6, wherein the compressed foundation model is implemented on an edge network, and wherein the foundation model is implemented on a datacenter of a cloud computing system.

8. The method of claim 1, wherein determining the first context profile and determining the second context profile are performed on a server device on an edge network of a fifth generation (5G) telecommunication environment, and wherein the foundation model is implemented on a datacenter of a cloud computing system accessible via the edge network.

9. In a computing environment including a foundation model for processing queries based on context generated for the queries, a method comprising:
receiving an input query including a request for a response from the foundation model;
determining, for the input query, a plurality of context profiles based on language of the input query and a context database, the plurality of context profiles being generated based on comparisons of text similarities between the input query and content of the context database;
generating and providing a plurality of prompts as inputs to the foundation model, the plurality of prompts including strings of text based on the input query and the plurality of context profiles;
determining a plurality of relevancy scores for a plurality of responses of the foundation model responsive to the plurality of prompts, the plurality of relevancy scores indicating metrics of confidence that responses from the plurality of responses are relevant to the input query; and
selecting a response from the plurality of responses based on a comparison of a relevancy score of the response and additional relevancy scores of the plurality of relevancy scores.

10. The method of claim 9, wherein the plurality of context profiles are generated based on different types of text similarity metrics.

11. The method of claim 9, wherein the plurality of context profiles are generated based on a combination of text similarity metrics, vector embeddings, and a plugin associated with the context database.

12. The method of claim 9, wherein selecting the response is based on the comparison of the relevancy score and the additional relevancy scores and based on a latency associated with generating a first response associated with the relevancy score being less than a threshold latency budget.

13. The method of claim 9, further comprising generating a collection of context profiles, the collection of context profiles including the plurality of context profiles and estimated relevancy scores associated with corresponding context profiles of the plurality of context profiles, the estimated relevancy scores being based on historical relevancy score data based on generating and providing the plurality of prompts as inputs to the foundation model.

14. The method of claim 9, wherein determining the plurality of relevancy scores includes providing the plurality of prompts as inputs to a compressed foundation model, the compressed foundation model being a compressed version of the foundation model.

15. The method of claim 14, wherein the compressed foundation model is implemented on an edge network, and wherein the foundation model is implemented on a datacenter of a cloud computing system.

16. The method of claim 9, wherein determining the plurality of context profiles is performed on a server device on an edge network of a fifth generation (5G) telecommunications environment, and wherein the foundation model is implemented on a datacenter of a cloud computing system accessible via the edge network.

17. A system, comprising:
- at least one processor;
- memory in electronic communication with the at least one processor; and
- instructions stored in the memory, the instructions being executable by the at least one processor to:
  - receive an input query including a request for a response from a foundation model;
  - determine, for the input query, a first context profile based on language of the input query and a context database, the first context profile being generated based on a first comparison of text similarities between the input query and content of the context database;
  - generate and provide a first prompt as input to the foundation model, the first prompt including a first string of text based on the input query and the first context profile;
  - determine a first relevancy score for a first response of the foundation model responsive to the first prompt, the first relevancy score indicating a metric of confidence that the first response is relevant to the input query;
  - determine, for the input query, a second context profile based on language of the input query and the context database, the second context profile being based on a second comparison of text similarities between the input query and content of the context database;
  - generate and provide a second prompt as input to the foundation model, the second prompt including a second string of text based on the input query and the second context profile;
  - determine a second relevancy score for a second response of the foundation model responsive to the second prompt, the second relevancy score indicating a metric of confidence that the second response is relevant to the input query; and
  - select one of the first response or the second response based on the first relevancy score or the second relevancy score.

18. The system of claim 17, wherein the second context profile is generated based on the first relevancy score being less than a threshold relevancy score.

19. The system of claim 17, wherein selecting the first response or the second response includes selecting the first response based on the first response having a higher relevancy score than the second response, and wherein selecting the first response is further based on a latency associated with generating the first response being less than a threshold latency budget.

20. The system of claim 17,
- wherein determining the first relevancy score includes providing the first prompt as input to a compressed foundation model,
- wherein determining the second relevancy score includes providing the second prompt as input to the compressed foundation model.

* * * * *